No. 853,398. PATENTED MAY 14, 1907.
W. G. CHAMBLEE.
EVAPORATING PAN.
APPLICATION FILED JAN. 31, 1907.
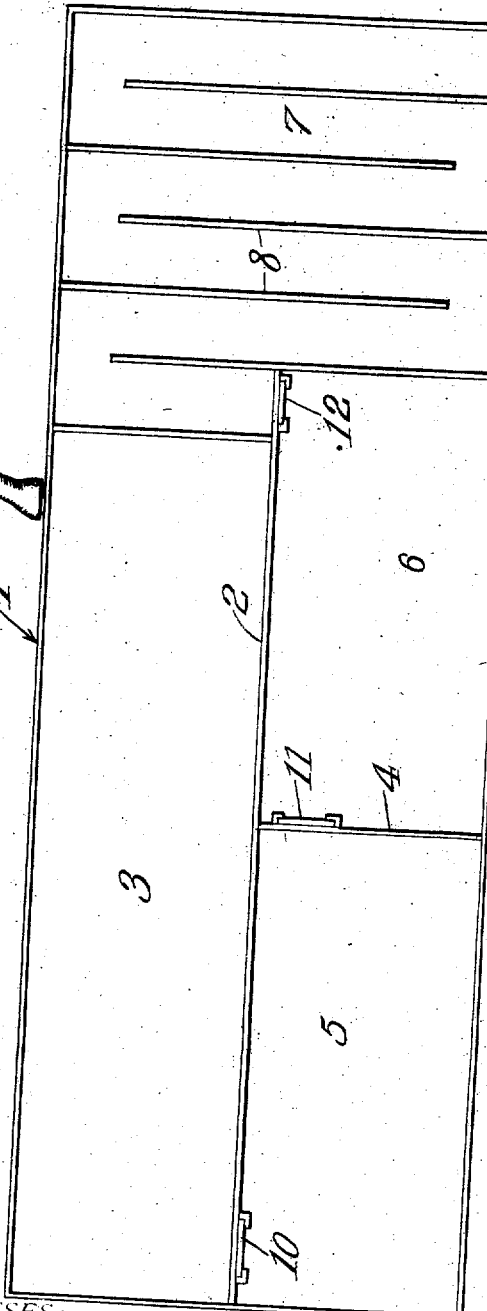
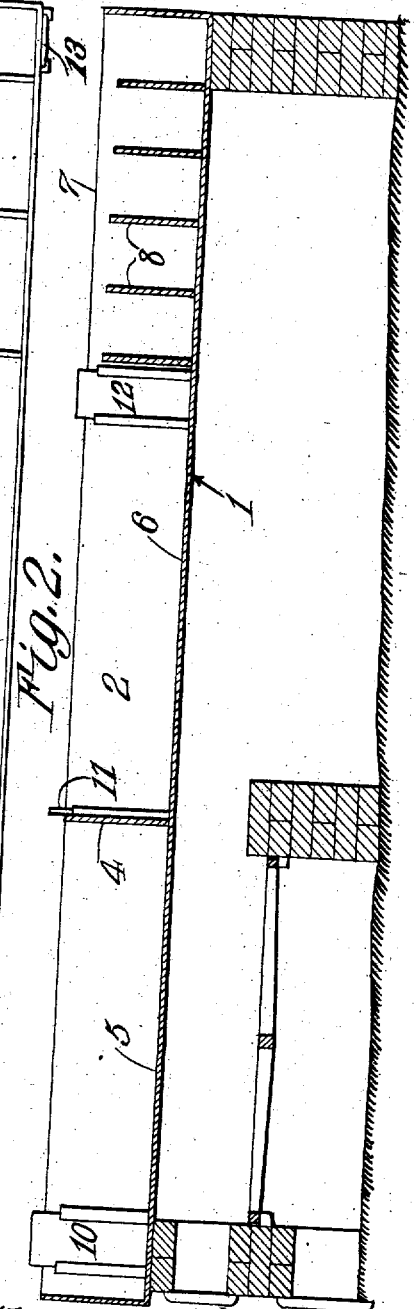
WITNESSES:
E. J. Stewart
C. Bradway
Wilson G. Chamblee INVENTOR.
By C. A. Snow & Co.
ATTORNEYS
THE NORRIS PETERS CO., WASHINGTON, D. C.

UNITED STATES PATENT OFFICE.

WILSON G. CHAMBLEE, OF VAN ZANDT COUNTY, TEXAS.

EVAPORATING-PAN.

No. 853,398.   Specification of Letters Patent.   Patented May 14, 1907.

Application filed January 31, 1907. Serial No. 355,119.

*To all whom it may concern:*

Be it known that I, WILSON G. CHAMBLEE, a citizen of the United States, residing in the county of Van Zandt and State of Texas, have invented a new and useful Evaporating-Pan, of which the following is a specification.

This invention has relation to evaporating pans and it consists in the novel construction and arrangement of its parts as hereinafter shown and described.

The object of the invention is to provide a pan of simple construction, the parts of which, however, are so arranged that green juices may be easily and readily relieved of scum and incidental impurities by the exercise of a minimum amount of manual labor. The pan being also constructed as to convert such juices into syrups. The pan is substantially oblong in plan and is adapted to rest upon a furnace of usual construction. That end of the pan which is located over the hottest part of the furnace is provided with compartments which are divided from each other by a partition extending along the longitudinal central axis of the pan. The green juices are introduced into the compartment located at one side of said longitudinal partition and the juice is led from the first said compartment into the second said compartment through a gate located in the said partition near the end of the pan. The second said compartment is divided by a transverse partition into two chambers. The said chambers communicate with one another by a gate located in the transverse partition in the vicinity of the longitudinally disposed partition. The chamber located at the intermediate portion of the pan communicates with a chamber at the end of the pan containing vertically disposed partitions arranged as baffle plates. The said chamber communicates with the baffle plate compartment by means of a gate located in the longitudinally disposed partition.

In the accompanying drawing:—Figure 1 is a top plan view of the pan, and Fig. 2 is a longitudinal sectional view of the same.

The pan 1 is oblong in shape and is adapted to rest upon the top of a furnace as is usually employed for evaporating purposes. The said pan is provided at one end and along its central longitudinal axis with a partition 2 which forms at one side of the pan the compartment 3 and at the opposite side of the pan a compartment which is divided by the transverse partition 4 into the chambers 5 and 6. The said partition 4 extends from the side of the pan to the partition 2. The opposite end of the pan 1 is provided with a compartment 7 in which is located the zigzag arranged partitions 8 which form baffle plates. The bounding partitions and edges of the compartments and chambers 3, 5 and 6 are of greater vertical dimension than the said baffle plates 8. The inlet hose 9 is located in the side of the compartment 3 at the end thereof adjacent the compartment 7. The gate 10 is located in the partition 2 at the end thereof adjacent the end of the pan 1. The gate 11 is located in the partition 4 at the end thereof adjacent the partition 2, the gate 12 is located in the partition 2 at the end thereof adjacent the compartment 7 and the gate 13 is located in the side of the pan 1 adjacent the end thereof opposite to that end from which the partition 2 extends.

As the pan 1 is placed upon a furnace and the partition 2 is located directly above the fire that portion of the pan in the vicinity of the said partition 2 is subjected to heat of greatest intensity. When the green syrup is admitted through the hose 9 into the compartment 3 the said syrup or juice immediately begins to boil and boils with greatest vigor along the partition 2. Consequently, the scum of the juice and those impurities liberated by the boiling and taken up by the scum will be forced by the active boiling juice toward the longer side of the pan 1 and as the said scum collects it may be dipped from the juice at the long side of the pan 1. At the same time the juice passes through the gate 10 into the chamber 5 in which chamber it continues boiling with the scum moving toward the sides of the pan 1 as above described. The juice more actively moving as a consequence of the boiling and consequently freed of impurities and scum passes through the gate 11 which is located at one of the hottest points of the pan into the chamber 6. Any impurities that may have passed through the gate 11 will move to the side of the pan 1 forming one of the bounds of the said chamber 6. The purified juice passes from the chamber 6 through the gate 12 into the compartment 7 and passes by a tortuous route along the baffle plates 8 during which time it cools comparatively and flows through the gate 13 in the form of purified syrup.

Having described my invention what I claim as new and desire to secure by Letters Patent is:—

An evaporating pan comprising a body of oblong configuration, a partition extending from one end of the pan and being located along the central longitudinal axis thereof, a means for admitting juice to the pan, said partition having at its opposite ends gates, a partition extending transversely of the pan and joining with the edges of the pan and the first said partition at an intermediate point thereof and having a gate adjacent the longitudinally disposed partition, said pan having at its end opposite that end provided with the longitudinally extending partition, a compartment provided with transversely disposed baffle plates and an exit gate.

In testimony that I claim the foregoing as my own, I have hereto affixed my signature in the presence of two witnesses:

WILSON G. CHAMBLEE.

Witnesses:
E. T. GRAY,
J. L. STANDLEY.